(12) United States Patent
An et al.

(10) Patent No.: US 11,469,428 B2
(45) Date of Patent: Oct. 11, 2022

(54) FUEL CELL MEMBRANE HUMIDIFIER CAPABLE OF CONTROLLING FLOW DIRECTION OF FLUID

(71) Applicant: Kolon Industries, Inc., Seoul (KR)

(72) Inventors: Na-Hyeon An, Seoul (KR); Kyoung-Ju Kim, Seoul (KR); Young-Seok Oh, Seoul (KR); Jin-Hyung Lee, Seoul (KR); Woong-Jeon Ahn, Seoul (KR)

( * ) Notice: Subject to any disclaimer, the term of this patent is extended or adjusted under 35 U.S.C. 154(b) by 272 days.

(21) Appl. No.: 16/958,340

(22) PCT Filed: Dec. 28, 2018

(86) PCT No.: PCT/KR2018/016895
§ 371 (c)(1),
(2) Date: Jun. 26, 2020

(87) PCT Pub. No.: WO2019/132606
PCT Pub. Date: Jul. 4, 2019

(65) Prior Publication Data
US 2021/0066733 A1    Mar. 4, 2021

(30) Foreign Application Priority Data
Dec. 29, 2017  (KR) .......................... 10-2017-0184479

(51) Int. Cl.
| H01M 8/04 | (2016.01) |
| H01M 8/04119 | (2016.01) |
| B01D 63/02 | (2006.01) |

(52) U.S. Cl.
CPC ........ *H01M 8/04126* (2013.01); *B01D 63/02* (2013.01)

(58) Field of Classification Search
CPC .......................... H01M 8/04126; B01D 63/02
(Continued)

(56) References Cited

U.S. PATENT DOCUMENTS

| 2001/0021467 A1 | 9/2001 | Suzuki et al. |
| 2010/0068603 A1 | 3/2010 | Kanazawa |

(Continued)

FOREIGN PATENT DOCUMENTS

| CN | 106102881 A | 11/2016 |
| EP | 2827073 A1 | 1/2015 |

(Continued)

OTHER PUBLICATIONS

Counterpart European search report dated Jun. 24, 2021.
International Search Report for PCT/KR2018/016895 dated Apr. 16, 2019 (PCT/ISA/210).

*Primary Examiner* — James M Erwin
(74) *Attorney, Agent, or Firm* — Harvest IP Law, LLP

(57) ABSTRACT

The present invention relates to a fuel cell membrane humidifier capable improving humidifying efficiency by controlling the flow direction of fluid, and the fuel cell membrane humidifier according to an embodiment of the present invention comprises: a hollow fiber membrane module for accommodating a hollow fiber membrane in which a first fluid and a second fluid perform moisture exchange while the first fluid flows therein and the second fluid flows on the outside thereof; and a housing part constituting the appearance of the membrane purifier, wherein a fluid guide part for uniformly guiding the flow of fluid is formed between the hollow fiber membrane and the housing part.

8 Claims, 3 Drawing Sheets

(58) Field of Classification Search
USPC .......................................................... 429/413
See application file for complete search history.

(56) References Cited

U.S. PATENT DOCUMENTS

| | | | |
|---|---|---|---|
| 2016/0079616 A1* | 3/2016 | Lee | C02F 1/44 |
| | | | 210/321.88 |
| 2016/0240870 A1* | 8/2016 | Kim | B01D 71/68 |
| 2016/0322654 A1 | 11/2016 | Koo et al. | |
| 2017/0100701 A1 | 4/2017 | Kim et al. | |
| 2017/0279138 A1* | 9/2017 | Desjardins | H01M 8/04126 |

FOREIGN PATENT DOCUMENTS

| | | |
|---|---|---|
| JP | 2001-202977 A | 7/2001 |
| JP | 2002-358988 A | 12/2002 |
| JP | 2004-006100 A | 1/2004 |
| JP | 2008-309371 A | 12/2008 |
| KR | 10-2016-0129243 A | 11/2016 |

* cited by examiner

FUEL CELL MEMBRANE HUMIDIFIER CAPABLE OF CONTROLLING FLOW DIRECTION OF FLUID

CROSS REFERENCE TO RELATED APPLICATIONS

This application is a National Stage of International Application No. PCT/KR2018/016895 filed Dec. 28, 2018, claiming priority based on Korean Patent Application No. 10-2017-0184479 filed Dec. 29, 2017.

TECHNICAL FIELD

The present disclosure relates to a fuel cell membrane humidifier capable of controlling the flow direction of a fluid, thereby improving humidification efficiency.

BACKGROUND ART

A fuel cell is a power generation cell that combines hydrogen and oxygen to generate electricity. Such a fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors that improve the performance of the polymer electrolyte membrane fuel cell is to supply a predetermined amount or more of moisture to a polymer electrolyte membrane or a proton exchange membrane (PEM) of a membrane electrode assembly (MEA) in order to retain water content. The reason for this is that, in the case in which the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas flowing pipe through a solenoid valve, and 3) a humidification membrane method of supplying moisture to a gas flowing layer using a polymer separation membrane are used as methods of humidifying the polymer electrolyte membrane or the proton exchange membrane.

Among these methods, the humidification membrane method, which provides water vapor to a gas that is supplied to the polymer electrolyte membrane or the proton exchange membrane using a membrane configured to selectively transmit only water vapor included in an exhaust gas in order to humidify the polymer electrolyte membrane or the proton exchange membrane, is advantageous in that it is possible to reduce the weight and size of a humidifier.

In the case in which a module is formed, a hollow fiber membrane having large transmission area per unit volume is preferably used as the selective transmission membrane used in the humidification membrane method. That is, in the case in which a humidifier is manufactured using a hollow fiber membrane, high integration of the hollow fiber membrane having large contact surface area is possible, whereby it is possible to sufficiently humidify a fuel cell even in the case of a small capacity, it is possible to use a low-priced material, and it is possible to collect moisture and heat included in a non-reaction gas discharged from the fuel cell at a high temperature and to reuse the collected moisture and heat through the humidifier.

Meanwhile, in the case of a hollow fiber membrane having large transmission area per unit volume, high integration of the hollow fiber membrane is possible, whereby it is possible to sufficiently humidify a fuel cell even in the case of a small capacity. In the case in which the hollow fiber membrane is highly integrated, however, a fluid does not uniformly flow outside the hollow fiber membrane due to resistance of the hollow fiber membrane.

In addition, since the flow of the fluid is not uniform, the area of the membrane that is used is reduced and thus only a portion of the membrane is used, whereby humidification efficiency is reduced.

DISCLOSURE

Technical Problem

The present disclosure has been made in view of the above problems, and it is an object of the present disclosure to provide a fuel cell membrane humidifier capable of uniformly controlling the flow of a fluid and guiding the fluid to unused humidification membranes even in the case in which hollow fiber membranes are highly integrated, thereby improving humidification efficiency.

Technical Solution

A fuel cell membrane humidifier according to an embodiment of the present disclosure includes a hollow fiber membrane module configured to receive hollow fiber membranes, in which a first fluid flows and outside which a second fluid flows such that the first fluid and the second fluid exchanges moisture with each other, and a housing unit defining the external appearance of the membrane humidifier, wherein a fluid guide unit configured to uniformly guide the flow of a fluid is formed between the hollow fiber membranes and the housing unit.

In the fuel cell membrane humidifier according to the embodiment of the present disclosure, the fluid guide unit may include a base unit configured to wrap the hollow fiber membranes and a protrusion unit formed on the base unit, the protrusion unit protruding so as to have a predetermined size.

In the fuel cell membrane humidifier according to the embodiment of the present disclosure, the protrusion unit may include a plurality of stripes, and the plurality of stripes may be formed to have a height equivalent to 50 to 300% of the diameter of a single hollow fiber membrane.

In the fuel cell membrane humidifier according to the embodiment of the present disclosure, the protrusion unit may include a plurality of stripes, and the plurality of stripes may be formed to have an interval therebetween equivalent to 50 to 300% of the diameter of a single hollow fiber membrane.

In the fuel cell membrane humidifier according to the embodiment of the present disclosure, the protrusion unit may include a plurality of stripes, and the angle defined between each of the plurality of stripes and the central axis of the hollow fiber membrane module may range from 30 to 90°.

In the fuel cell membrane humidifier according to the embodiment of the present disclosure, the protrusion unit may include a plurality of stripes, the plurality of stripes may be formed to have a height equivalent to 50 to 300% of the diameter of a single hollow fiber membrane, the plurality of stripes may be formed to have an interval therebetween equivalent to 50 to 300% of the diameter of a single hollow fiber membrane, and the angle defined between each of the plurality of stripes and the central axis of the hollow fiber membrane module may range from 30 to 90°.

In the fuel cell membrane humidifier according to the embodiment of the present disclosure, the fluid may be the second fluid of high-humidity.

Advantageous Effects

According to the embodiment of the present disclosure, the flow of the fluid introduced into the hollow fiber membrane module is guided uniformly or in a desired direction by the protrusion unit of the fluid guide unit, whereby it is possible to improve humidification efficiency.

In addition, the dual-layer net structure constituted by the base unit and the protrusion unit, each of which has a predetermined height, is formed between the hollow fiber membranes and the housing unit in order to prevent direct contact between the hollow fiber membranes and the inner wall of the housing unit, whereby it is possible to prevent damage to the hollow fiber membranes due to the inner wall of the housing unit.

BEST MODE

The present disclosure may be changed in various manners and may have various embodiments, wherein specific embodiments will be illustrated and described in detail in the following detailed description. However, the present disclosure is not limited to the specific embodiments, and it should be understood that the present disclosure includes all modifications, equivalents, or substitutions included in the idea and technical scope of the present disclosure.

The terms used in the present disclosure are provided only to describe the specific embodiments, and do not limit the present disclosure. Singular forms are intended to include plural forms as well, unless the context clearly indicates otherwise. In the present disclosure, it should be understood that the terms "includes," "has," etc. specify the presence of features, numbers, steps, operations, elements, components, or combinations thereof described in the specification, but do not preclude the presence or addition of one or more other features, numbers, steps, operations, elements, components, or combinations thereof. Hereinafter, a hollow fiber membrane module including hollow fiber membranes made of different materials according to an embodiment of the present disclosure and a fuel cell membrane humidifier including the same will be described with reference to the accompanying drawings.

Figure 1:
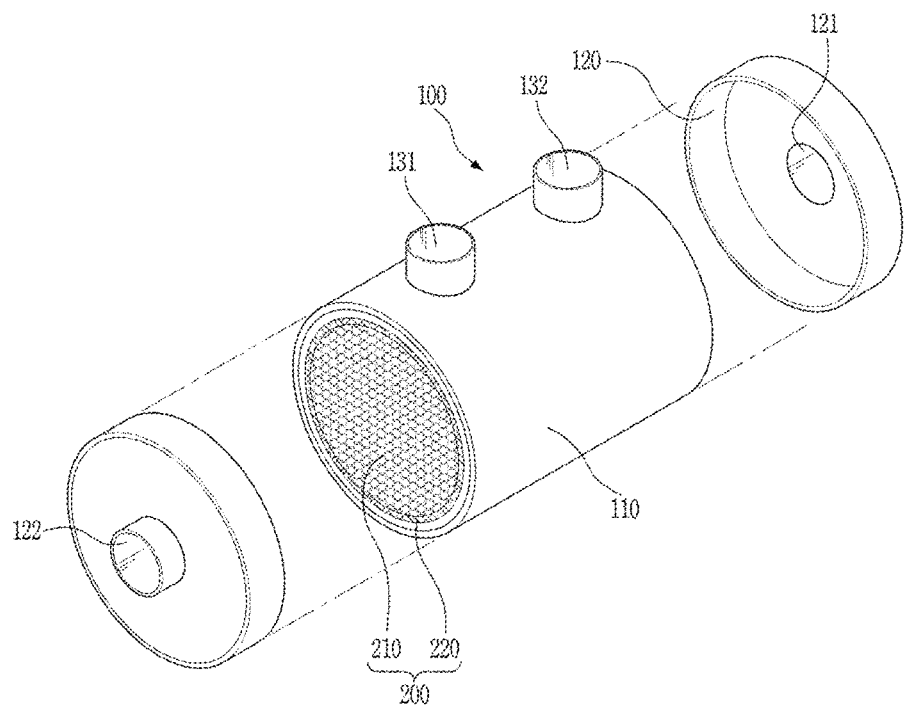
FIG. 1 is a view showing a fuel cell membrane humidifier according to an embodiment of the present disclosure.
Figure 2:
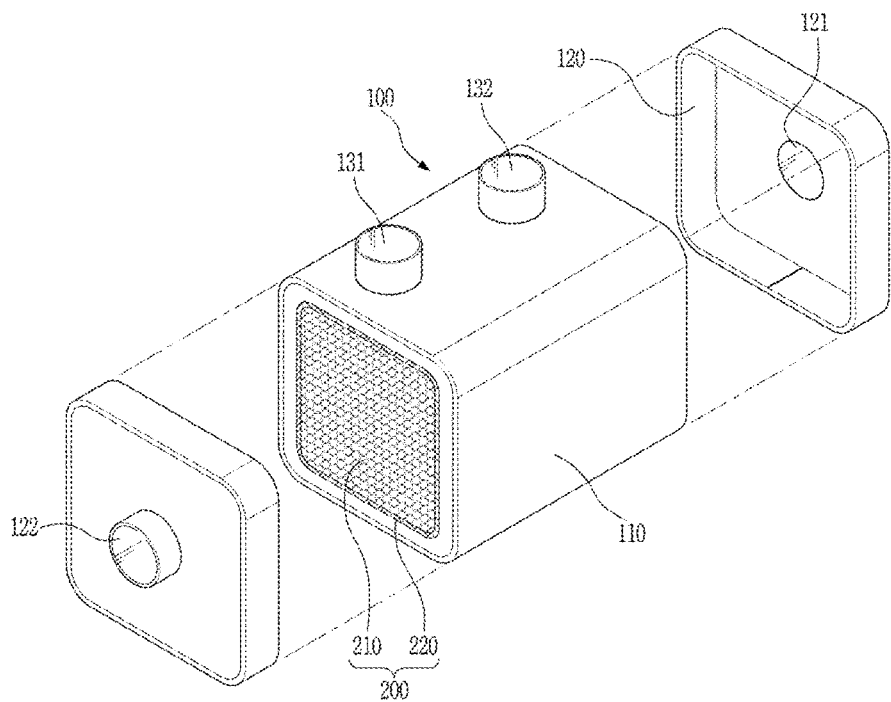
FIG. 2 is a view showing a modification of the fuel cell membrane humidifier according to the embodiment of the present disclosure.

FIG. 1 is a view showing a fuel cell membrane humidifier according to an embodiment of the present disclosure, and FIG. 2 is a view showing a modification of the fuel cell membrane humidifier according to the embodiment of the present disclosure.

As shown in FIGS. 1 and 2, the fuel cell membrane humidifier according to the embodiment of the present disclosure includes a housing unit 100 and a hollow fiber membrane module 200.

The housing unit 100 defines the external appearance of the membrane humidifier. The housing unit 100 may include a housing body 110 and housing caps 120, which may be coupled to each other in order to constitute an integrated housing unit. Each of the housing body 110 and the housing caps 120 may be made of hard plastic, such as polycarbonate, or metal.

In addition, the lateral sectional shape of each of the housing body 110 and the housing caps 120 may be a circle, as shown in FIG. 1, or the lateral sectional shape thereof may be a polygon, as shown in FIG. 2. The polygon may be a rectangle, a square, a trapezoid, a parallelogram, a pentagon, or a hexagon, and corners of the polygon may be round. In addition, the circle may be an oval.

The housing body 110 is provided at opposite ends thereof with a second fluid inlet 131, through which a second fluid is supplied, and a second fluid outlet 132, through which the second fluid is discharged. A first fluid may be a low-humidity fluid, and the second fluid may be a high-humidity fluid. Alternatively, the second fluid may be a low-humidity fluid, and the first fluid may be a high-humidity fluid.

The housing caps 120 are coupled to opposite ends of the housing body 110. The housing caps 120 are provided with a first fluid inlet 121 and a first fluid outlet 122, respectively. A first fluid introduced through the first fluid inlet 121 of one of the housing caps 120 is introduced into the hollow fiber membrane module 200, passes through an inner pipeline of each hollow fiber membrane, flows out of the hollow fiber membrane module 200, and is discharged outside through the first fluid outlet 122 of the other housing cap 120.

A plurality of bundles of hollow fiber membranes 210 configured to selectively transmit moisture may be disposed in the hollow fiber membrane module 200. Each bundle of hollow fiber membranes may be disposed in the form of a cartridge.

The hollow fiber membranes 210 may be hollow fiber membranes made of, for example, Nafion, polyetherimide, or polyphenylsulfone.

A fluid guide unit 220 configured to uniformly guide the flow of a fluid is formed around the hollow fiber membranes 210. Here, the fluid may be a high-humidity fluid. The fluid guide unit 220 will be described later with reference to FIGS. 3 to 6.

The hollow fiber membrane module 200 is provided at opposite ends thereof with potting units (not shown) configured to bind the hollow fiber membranes 210 and the fluid guide unit 220 and to fill gaps between the hollow fiber membranes. As a result, the opposite ends of the hollow fiber membrane module 200 are blocked by the potting units, whereby a flow channel configured to allow the second fluid to pass therethrough is defined in the hollow fiber membrane module. Each of the potting units is made of a known material, and a detailed description thereof will be omitted from this specification.

Figure 3:
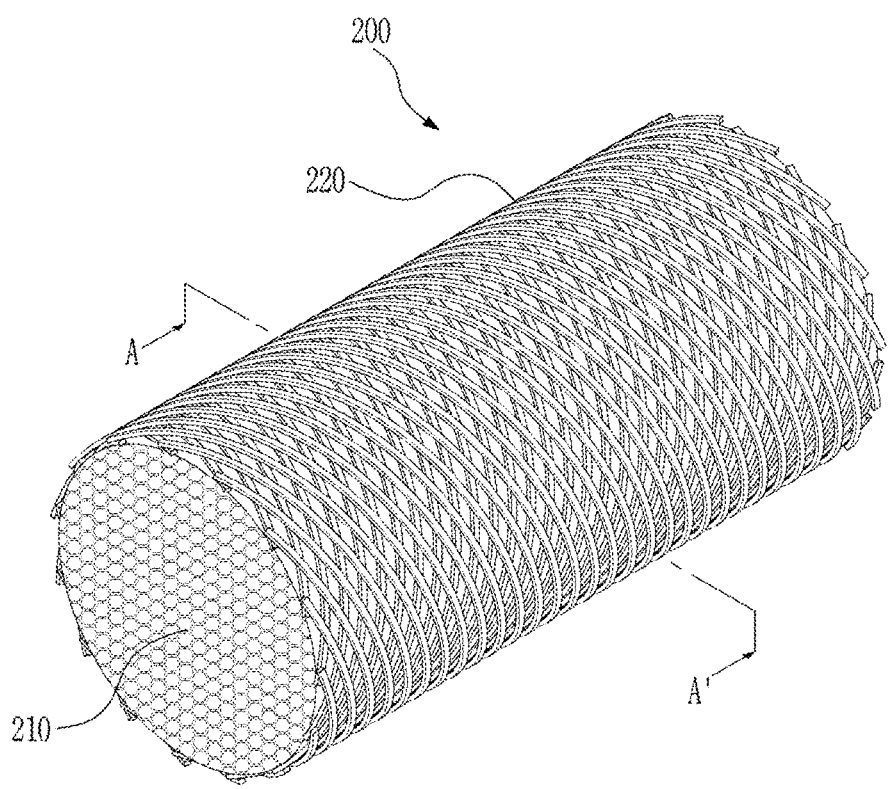
FIG. 3 is a view showing a hollow fiber membrane module of the fuel cell membrane humidifier according to the embodiment of the present disclosure.
Figure 4:
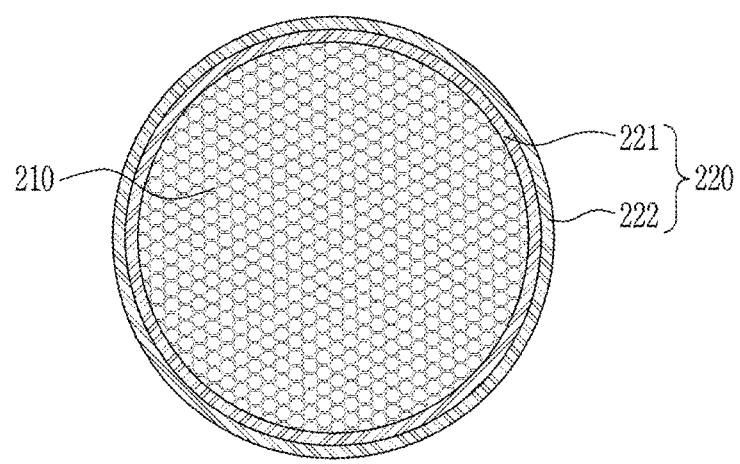
FIG. 4 is a sectional view taken along line A-A' of FIG. 3.
Figure 5:
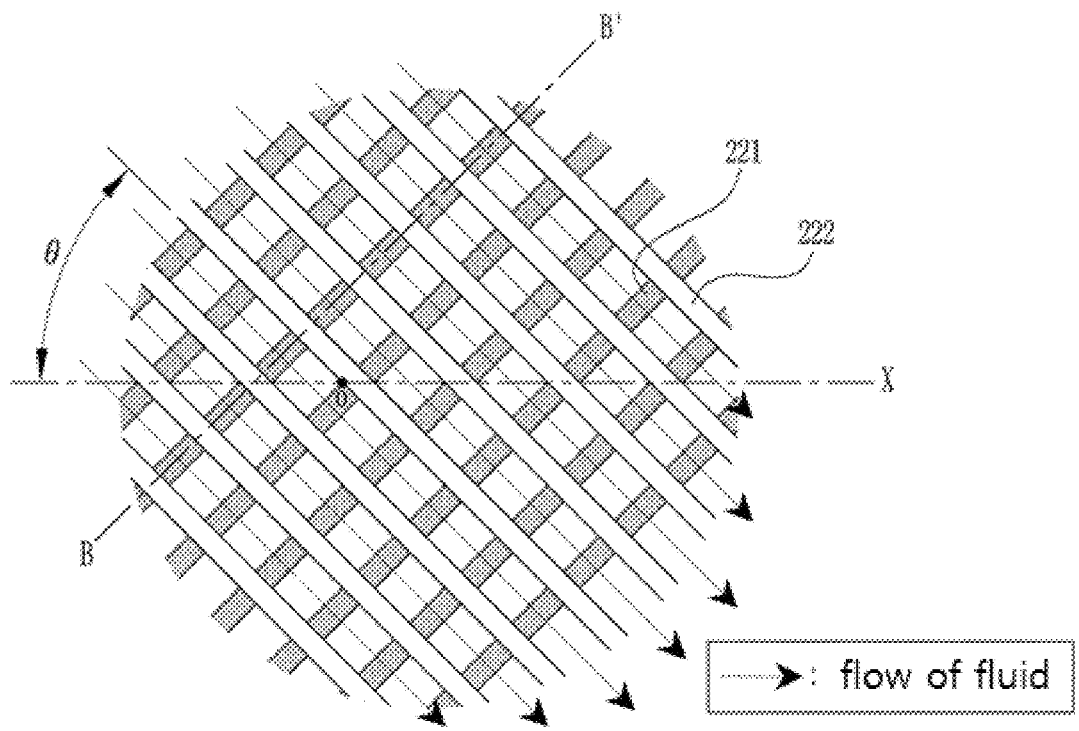
FIG. 5 is a view showing a fluid guide unit according to an embodiment of the present disclosure.
Figure 6:
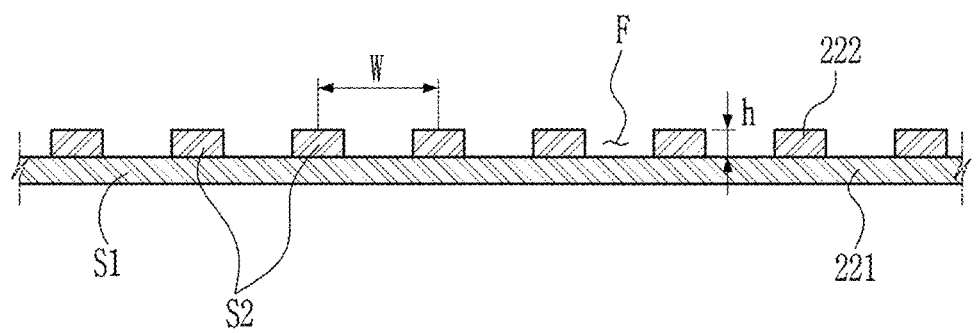
FIG. 6 is a sectional view taken along line B-B' of FIG. 5.

FIG. 3 is a view showing the hollow fiber membrane module of the fuel cell membrane humidifier according to the embodiment of the present disclosure, FIG. 4 is a sectional view taken along line A-A' of FIG. 3, FIG. 5 is a view showing a fluid guide unit 220 according to an embodiment of the present disclosure, and FIG. 6 is a sectional view taken along line B-B' of FIG. 5.

As shown in FIGS. 3 and 4, the fluid guide unit 220 uniformly guides the flow of a fluid through a dual-layer net structure. The fluid guide unit 220 includes a base unit 221 and a protrusion unit 222.

The base unit 221 includes a plurality of first stripes S1 having a predetermined height (see FIG. 6), which wrap the circumference of the hollow fiber membranes 210 in the state of being spaced apart from each other by a predetermined distance. The base unit 221 performs a function of fixing and supporting the hollow fiber membranes 210 such that the hollow fiber membranes 210 do not shake.

The protrusion unit 222 is formed on the base unit 221, and includes a plurality of second stripes S2 protruding from the base unit so as to have a predetermined size (see FIG. 6). The protrusion unit 222 uniformly guides the flow of a high-humidity fluid introduced into the hollow fiber membrane module 200. For example, the flow of a high-humidity second fluid introduced through the second fluid inlet 131 is uniformly guided by the protrusion unit 222 before the second fluid flows outside the hollow fiber membranes 210, and then the second fluid exchanges moisture with a low-humidity first fluid flowing in the hollow fiber membranes 210 while flowing outside the hollow fiber membranes 210.

The protrusion unit 222 is formed so as to have a predetermined height, interval, and angle in order to effectively control the flow direction of the high-humidity fluid.

Referring to FIGS. 5 and 6, the protrusion unit 222 defines a flow channel F, and the height h of the protrusion unit 222 corresponds to the depth of the flow channel F.

Preferably, the height h of the protrusion unit 222 is formed so as to be equivalent to 50 to 300% of the diameter of a single hollow fiber membrane. Here, the diameter of a single hollow fiber membrane may be, for example, about 1 mm, and therefore the height h of the protrusion unit 222 may be formed so as to have a size of 0.5 to 3 mm.

In the case in which the height h of the protrusion unit 222 is less than 50% of the diameter of a single hollow fiber membrane, a flow channel having a sufficient depth is not formed, whereby the fluid introduced into the hollow fiber membrane module 200 may not flow along the flow channel F and may then be discharged outside. Also, in the case in which the height h of the protrusion unit 222 is greater than 300% of the diameter of a single hollow fiber membrane, the effect is equal to the effect in the case in which the height of the protrusion unit is less than 300% of the diameter of a single hollow fiber membrane, and therefore this is not suitable for miniaturization.

Preferably, the interval W between the second stripes S2 constituting the protrusion unit 222 is formed so as to be equivalent to 50 to 300% of the diameter of a single hollow fiber membrane. Here, the diameter of a single hollow fiber membrane may be, for example, about 1 mm, and therefore the interval W between the second stripes S2 may be formed so as to have a size of 0.5 to 3 mm.

In the case in which the interval W between the second stripes S2 is less than 50% of the diameter of a single hollow fiber membrane and in the case in which the interval W between the second stripes S2 is greater than 300% of the diameter of a single hollow fiber membrane, the interval is too small or too large, whereby the effect of adjusting the flow of a fluid is insignificant.

Preferably, the angle $\theta$ between each second stripe S2 constituting the protrusion unit 222 and the central axis X of the hollow fiber membrane module 200 (see FIGS. 3 and 5) ranges from 30 to 90°. In the case in which the angle $\theta$ is less than 30°, there is a high possibility that the fluid introduced into the hollow fiber membrane module 200 will be directly discharged from the hollow fiber membrane module 200 while not sufficiently staying in the flow channel. Meanwhile, in axis symmetry based on the X axis or in point symmetry based on the point O, the second to fourth quadrants in which the angle $\theta$ ranges from 90 to 360° are identical to the first quadrant (in the case in which the angle $\theta$ ranges from 0 to 90°) in the terms of a fluid, and therefore a description thereof will be omitted.

Next, a process of moisture exchange between the first fluid and the second fluid in the membrane humidifier constructed as described above will be described. In the following description, the first fluid may be a low-humidity fluid, and the second fluid may be a high-humidity fluid. Alternatively, the second fluid may be a low-humidity fluid, and the first fluid may be a high-humidity fluid.

The first fluid flows in the hollow fiber membranes 210 of the hollow fiber membrane module 200, and is then discharged from the membrane humidifier through the first fluid outlet 122 of the other housing cap 120. Meanwhile the first fluid may flow in the direction in which the first fluid is introduced through the first fluid outlet 122 and is then discharged through the first fluid inlet 121.

The second fluid is supplied to the housing body 111 through the second fluid inlet 131 of the housing body 110, flows outside the hollow fiber membranes 210, and is then discharged outside through the second fluid outlet 132 of the housing body 110.

At this time, the flow of the second fluid is uniformly guided by the second stripes constituting the protrusion unit 222 before the second fluid flows outside the hollow fiber membranes 210, and then the second fluid is introduced into spaces defined between the first stripes constituting the base unit 221, and flows outside the hollow fiber membranes 210, during which the second fluid exchanges moisture with the low-humidity first fluid flowing in the hollow fiber membranes 210.

According to the embodiment of the present disclosure described above, the flow of the fluid introduced into the hollow fiber membrane module 200 is uniformly guided by the protrusion unit of the fluid guide unit, whereby it is possible to improve humidification efficiency.

In addition, the dual-layer net structure constituted by the base unit and the protrusion unit, each of which has a predetermined height, is formed between the hollow fiber membranes and the housing unit in order to prevent direct contact between the hollow fiber membranes and the inner wall of the housing unit, whereby it is possible to prevent damage to the hollow fiber membranes due to the inner wall of the housing unit.

Although embodiments of the present disclosure have been described above, it will be apparent from a person having ordinary skill in the art to which the present disclosure pertains that the present disclosure can be variously modified and altered through addition, change, deletion, or supplement of components without departing from the idea of the present disclosure recited in the following claims and that such modifications and alterations fall within the scope of right of the present disclosure.

| [Description of Reference Numerals] | |
| --- | --- |
| 100: Housing unit | 110: Housing body |
| 120: Housing caps | 200: Hollow fiber membrane module |
| 210: Hollow fiber membranes | 220: Fluid guide unit |
| 221: Base unit | 222: Protrusion unit |

The invention claimed is:

1. A membrane humidifier for a fuel cell, the membrane humidifier comprising:
a hollow fiber membrane module comprising hollow fiber membranes configured to allow moisture exchange between a first fluid flowing inside the hollow fiber membranes and a second fluid flowing outside the hollow fiber membranes;
a housing unit defining an external appearance of the membrane humidifier,
wherein
a fluid guide unit configured to uniformly guide a flow of the second fluid is formed between the hollow fiber membranes and the housing unit,
the fluid guide unit comprises a base unit configured to wrap the hollow fiber membranes and a protrusion unit formed on the base unit, the protrusion unit protruding so as to have a predetermined size,
the protrusion unit comprises a plurality of stripes, and
the plurality of stripes are formed to have a height equivalent to 50 to 300% of a diameter of a single hollow fiber membrane.

2. A membrane humidifier for a fuel cell, the membrane humidifier comprising:
a hollow fiber membrane module comprising hollow fiber membranes configured to allow moisture exchange between a first fluid flowing inside the hollow fiber membranes and a second fluid flowing outside the hollow fiber membranes;
a housing unit defining an external appearance of the membrane humidifier,
wherein
a fluid guide unit configured to uniformly guide a flow of the second fluid is formed between the hollow fiber membranes and the housing unit,
the fluid guide unit comprises a base unit configured to wrap the hollow fiber membranes and a protrusion unit formed on the base unit, the protrusion unit protruding so as to have a predetermined size,
the protrusion unit comprises a plurality of stripes, and
the plurality of stripes are formed to have an interval therebetween equivalent to 50 to 300% of a diameter of a single hollow fiber membrane.

3. A membrane humidifier for a fuel cell, the membrane humidifier comprising:
a hollow fiber membrane module comprising hollow fiber membranes configured to allow moisture exchange between a first fluid flowing inside the hollow fiber membranes and a second fluid flowing outside the hollow fiber membranes;
a housing unit defining an external appearance of the membrane humidifier,
wherein
a fluid guide unit configured to uniformly guide a flow of the second fluid is formed between the hollow fiber membranes and the housing unit,
the fluid guide unit comprises a base unit configured to wrap the hollow fiber membranes and a protrusion unit formed on the base unit, the protrusion unit protruding so as to have a predetermined size,
the protrusion unit comprises a plurality of stripes, and
an angle defined between each of the plurality of stripes and a central axis of the hollow fiber membrane module ranges from 30 to 90°.

4. A membrane humidifier for a fuel cell, the membrane humidifier comprising:
a hollow fiber membrane module comprising hollow fiber membranes configured to allow moisture exchange between a first fluid flowing inside the hollow fiber membranes and a second fluid flowing outside the hollow fiber membranes;
a housing unit defining an external appearance of the membrane humidifier,
wherein:
a fluid guide unit configured to uniformly guide a flow of the second fluid is formed between the hollow fiber membranes and the housing unit;
the fluid guide unit comprises a base unit configured to wrap the hollow fiber membranes and a protrusion unit formed on the base unit, the protrusion unit protruding so as to have a predetermined size;
the protrusion unit comprises a plurality of stripes;
the plurality of stripes are formed to have a height equivalent to 50 to 300% of a diameter of a single hollow fiber membrane;
the plurality of stripes are formed to have an interval therebetween equivalent to 50 to 300% of a diameter of a single hollow fiber membrane; and
an angle defined between each of the plurality of stripes and a central axis of the hollow fiber membrane module ranges from 30 to 90°.

5. The membrane humidifier according to claim 1, wherein the second fluid has higher humidity than the first fluid.

6. The membrane humidifier according to claim 2, wherein the second fluid has higher humidity than the first fluid.

7. The membrane humidifier according to claim 3, wherein the second fluid has higher humidity than the first fluid.

8. The membrane humidifier according to claim 4, wherein the second fluid has higher humidity than the first fluid.

* * * * *